United States Patent Office 3,418,307
Patented Dec. 24, 1968

3,418,307
DEAMINO¹-PHENYLALANYL²-ARGININE⁸-VASOPRESSIN
Roger Boissonnas, Bottmingen, and René Huguenin, Reinach, Basel-Land, Switzerland, assignors to Sandoz Ltd. (also known as Sandoz A.G), Basel, Switzerland
No Drawing. Filed Mar. 17, 1966, Ser. No. 535,006
Claims priority, application Switzerland, Apr. 15, 1965, 5,297/65
1 Claim. (Cl. 260—112.5)

ABSTRACT OF THE DISCLOSURE

The invention relates to new polypeptides from the group consisting of a polypeptide of the formula

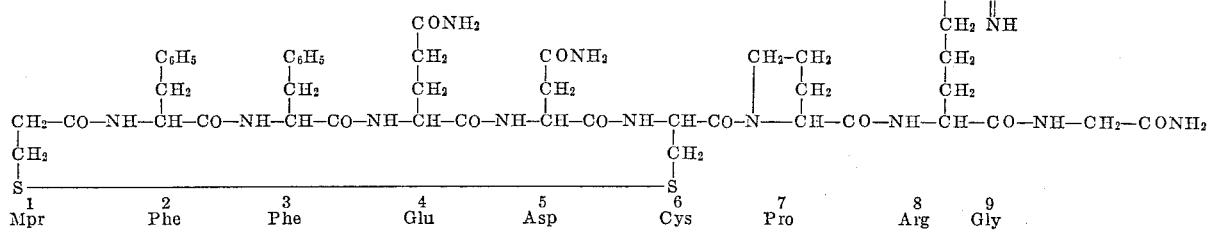

and its acid additional salts. The compounds are pharmaceutically active as exhibited by especially high antidiuretic activity and by unusual and unexpectedly high ratio of antidiuretic to pressoric activity. Pharmaceutical preparations and treatment of diabetes insipidus are also illustrated.

---

The present invention relates to a new polypeptide and a process for its production.

The present invention provides the polypeptide of Formula I,

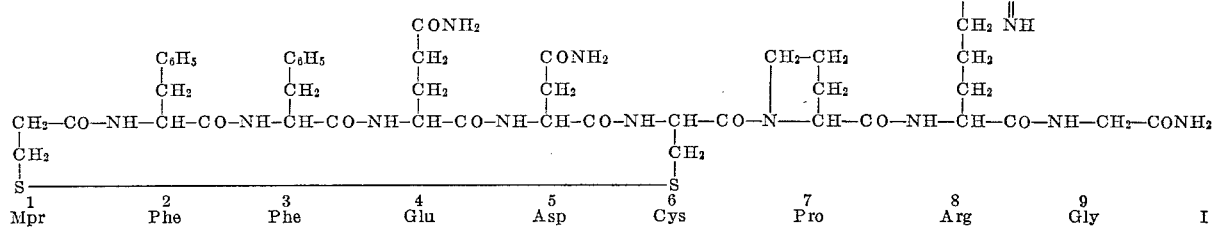

and its acid addition salts.

The present invention further provides a process for the production of compound I and its acid addition salts, characterized in that a polypeptide of Formula V,

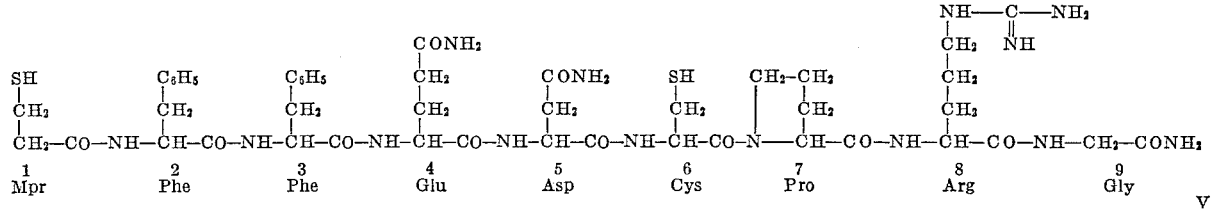

is oxidized in aqueous or aqueous organic solution at a pH value of 4 to 9, in manner known per se and, when an acid addition salt is desired, the resulting polypeptide I is salified.

The oxidation of the polypeptide V to give the desired final product I is preferably effected with air, oxygen, hydrogen peroxide, potassium ferricyanide or 1,2-diiodoethane. An aqueous alcoholic solution or a mixture of acetone and water may, for example, be used as the aqueous organic solution.

The polypeptide of Formula V may be obtained by splitting off the protective radicals R' and R" in one or more stages from an octapeptide derivative of general Formula IV below, in which R' denotes a radical capable of protecting a sulfhydryl radical in peptide synthesis, and R" denotes a radical capable of protecting a guanido radical in peptide synthesis.

The octapeptide derivative IV may be obtained by known methods for the synthesis of polypeptides, it being possible to join together the amino acids and β-mercaptopropionic acid in the order indicated in the general Formula IV one at a time or by first forming constituent peptide units and joining these together.

The term "known methods" as utilized herein designates methods in use or described in the literature on the subject.

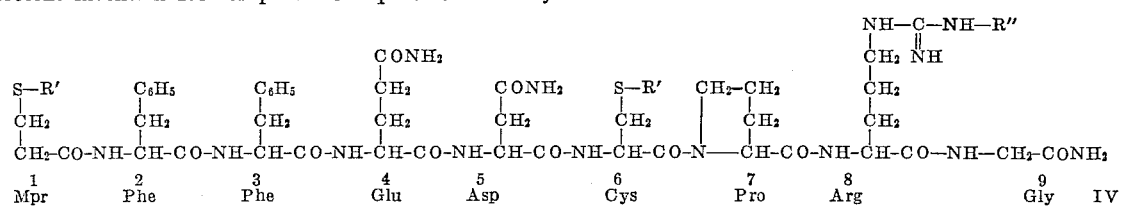

The octapeptide derivative IV may, for example, be produced in that a hexapeptide derivative of general Formula II,

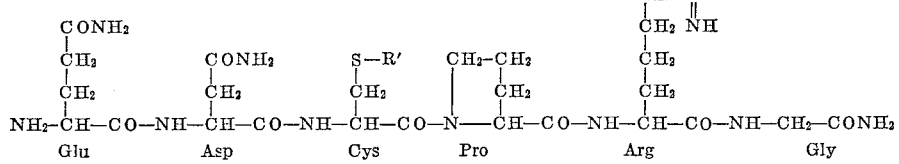

in which R' and R" have the above significance, is condensed with a reactive derivative of a free acid of general Formula III,

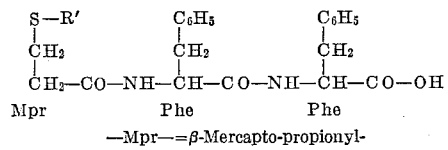

—Mpr—=β-Mercapto-propionyl-    III in which R' has the above significance.

Examples of radicals for protecting the sulfhydryl radical in the above process by temporarily blocking it are the benzyl or p-xylyl radicals, while examples of radicals for protecting the guanido radical are the p-toluenesulfonyl or benzenesulfonyl radicals.

It should be noted that the octapeptide derivative IV need not be produced in the manner described above as it may also be produced by condensation of two polypeptides other than the ones indicated above (or a polypeptide and an amino acid) in the form of their protected derivatives, or an octapeptide and β-mercaptopropionic acid in the form of their protected derivatives.

The starting materials for the production of the octapeptide derivative IV, insofar as they are unknown, are produced by known methods for the synthesis of peptides, it being possible to join together the amino acids and β-mercaptopropionic acid one at a time or by first forming constituent peptide units and joining these together.

Compound I, which may be called Deamino¹-Phe²-Arg⁸-vasopressin, has antidiuretic effect which is considerably stronger than that of natural human vasopressin, Arg⁸-vasopressin of Formula VI, The selective antidiuretic effect of Compound I could not be foreseen from the hitherto known relationships between chemical structure and biological activity of compounds with a similar structure, as the removal of the free amino radical in the 1-position (Deamino¹-Arg⁸-vasopressin) and of the phenolic hydroxy radical in the 2-position (Phe²-Arg⁸-vasopressin) did not substantially increase the selectivity.

The dosage of Compound I should be adapted to the individual degree of hormone deficiency which may vary considerably and has a range of 0.1 to 5 IU administered 3 to 4 times daily subcutaneously or intramuscularly.

The polypeptide of the invention may be used in the form of a free base or a salt of an organic or inorganic acid or an acid radical containing polymer (e.g., alginic acid, carboxymethyl cellulose, tannic acid), either as a pharmaceutical on its own or in the form of appropriate medicinal preparations, e.g. for oral, parenteral, enteral or intranasal administration. In order to produce suitable medicinal preparations the compounds are worked up with inorganic or organic adjuvants which are inert and physiologically acceptable. Examples of such adjuvants are:

For tablets: lactose, starch, talc and stearic acid;
For injectable solutions: water, alcohols, glycerin and vegetable oils;
For suppositories: natural or hardened oils and waxes;
For intranasal sprays: water, glycerin and other liquid substances tolerated by the mucous membrane.

The preparations may furthermore contain suitable preserving, stabilizing and wetting agents, solubilizers, sweetening and coloring substances and flavorings.

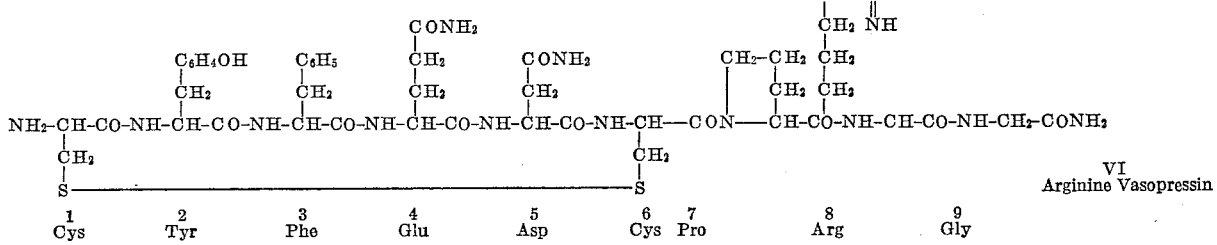

from which the new compound differs in that it has a β-mercaptopropionyl-L-phenylalanyl radical in place of an L-semi-cystinyl-L-tyrosyl radical in the positions 1 and 2.

Upon comparing the effects expressed in International Units (IU) it may be seen that natural arginine vasopressin has a pressoric effect which is as strong as its antidiuretic effect, whereas Compound I has a pressoric effect which amounts to only approximately one-thirtieth of its antidiuretic effect. The antidiuretic effect in comparison with the pressoric effect is therefore more selective in Compound I than in natural arginine vasopressin. Due to this property Compound I is especially indicated for use in the treatment of Diabetes insipidus.

| Compound | Antidiuretic effect in IU/mg. | Pressoric effect in IU/mg. | Relationship of the effects (selectivity) |
| --- | --- | --- | --- |
| Deamino ¹-Phe²=Arg⁸=vasopressin (compound I) | 800±170 | 29±7 | 27.5 |
| Arg⁸-vasopressin | 400 | 400 | 1 |
| Deamino¹-Arg⁸-vasopressin | 1,300±200 | 370±20 | 3.5 |
| Phe²-Arg⁸-vasopressin | 350 | 122±13 | 2.9 |

In the following non-limitative examples all temperatures are indicated in degrees centigrade.

EXAMPLE 1: POLYPEPTIDE I (a) S-benzyl-β-mercaptopropionic acid 2,4,5-trichlorophenyl ester 20 g. of S-benzyl-β-mercaptopropionic acid and 22 g. of 2,4,5-trichlorophenol are dissolved in 170 cc. of ethyl acetate and 20 ml. of acetonitrile, cooling is effected at —10° and then 21 g. of dicyclohexylcarbodiimide are added. The solution is shaken for 4 hours at room temperature, the dicyclohexylurea precipitate is filtered with suction and the filtrate is evaporated in a vacuum at 30°. The residue is dissolved in ethyl acetate and the solution is washed with aqueous sodium bicarbonate and then with water. After drying over sodium sulfate the ethyl acetate is evaporated. The residue is left to stand at —10° whereby S-benzyl-β-mercaptopropionic acid 2,4,5-trichlorophenyl ester, having a melting point of 17°, crystallizes.

(b) N-carbobenzoxy-L-phenylalanyl-L-phenylalaninemethyl ester 47 g. of L-phenylalaninemethyl ester in 200 cc. of dimethylformamide are added to 122 g. of N-carbobenzoxy-L-phenylalanine 2,4,5-trichlorophenyl ester. After 16 hours dilution is effected with 1200 cc. of ethyl acetate. The solution is washed with N hydrochloric acid, aqueous sodium bicarbonate and water. After drying over sodium sulfate, evaporating the ethyl acetate and recrystallizing the residue from chloroform/ether, N-carbobenzoxy-L-phenylalanine methyl ester, having a melting point of 149°, $[\alpha]_D^{22} = -18°$ (dimethylformamide), is obtained.

(c) S-benzyl-β-mercaptopropionyl-L-phenylalanyl-L-phenylalanine methyl ester 74 g. of N-carbobenzoxy-L-phenylalanyl-L-phenylalanine methyl ester are dissolved in 400 cc. of anhydrous acetic acid which have been saturated with hydrogen bromide. The solution is left to stand for one hour at 20°, evaporation is effected in a vacuum below 40° and the residue is carefully washed with diethyl ether. The residue is subsequently dissolved in 360 ml. of water at 0°, 22 g. of potassium carbonate are added and extraction is effected with ethyl acetate at 0°. After drying over sodium sulfate, 55 g. of S-benzyl-β-mercaptopropionic acid, 2,4,5-trichlorophenyl ester are added and the mixture is left to stand for 15 hours at 20°. The solution is washed with dilute hydrochloric acid and aqueous sodium carbonate, dried over sodium sulfate and the ethyl acetate is evaporated in a vacuum at 30°. The residue is washed with ether/petroleum ether (1:2). After drying in a high vacuum at 40° S-benzyl-β-mercaptopropionyl-L-phenylalanyl-L-phenylalanine methyl ester, having a melting point of 135°, $[\alpha]_D^{23} = -21°$ (dimethylformamide), is obtained.

(d) S-benzyl-β-mercaptopropionyl-L-phenylalanyl-L-phenylalanine hydrazide 52 g. of S-benzyl-β-mercaptopropionyl-L-phenylalanyl-L-phenylalanine methyl ester are dissolved in 260 cc. of anhydrous methanol, 32 cc. of anhydrous hydrazine are added and the mixture is left to stand for 15 hours at 20°. The precipitate is filtered with suction and washed with methanol. After drying in a vacuum at 50°, S-benzyl-β-mercaptopropionyl - L - phenylalanyl-L-phenylalanine hydrazide, having a melting point of 229°, $[\alpha]_D^{22} = -27°$ (0.3 N HCl in 95% acetic acid), is obtained.

(e) S - benzyl - β - mercaptopropionyl-L-phenylalanyl-L-phenylalanyl - L - glutaminyl-L-asparaginyl-S-benzyl-L-cysteinyl-L-prolyl-G-tosyl-L-arginyl-glycinamide 31 g. of S-benzyl-β-mercaptopropionyl-L-phenylalanyl-L-phenylalanine hydrazide are dissolved in a mixture of 250 ml. of dimethylformamide, 250 ml. of isopropanol and 32 cc. of 6 N hydrochloric acid, cooling is effected at −5° and 12.5 ml. of a 5 N solution of sodium nitrite in water are added while stirring. After 5 minutes the resulting solution is poured into 1.6 litres of a 0.25 N solution of sodium carbonate in water. The precipitate which forms is filtered with suction, washed with water, dried in a high vacuum at 2° and a solution of 50 g. of L-glutaminyl-L-asparaginyl - S - benzyl - L-cysteinyl-L-prolyl-G-tosyl-L-arginyl-glycinamide in 300 ml. of dimethylformamide is added. The mixture is left to stand for 2 days, 1200 cc. of ethyl acetate are subsequently added and the precipitate is washed with ethyl acetate. After drying at 30° the product is washed with warm methanol. S-benzyl-β-mercaptopropionyl - L - phenylalanyl-L-phenylalanyl-L-glutaminyl-L-asparaginyl - S - benzyl - L - cysteinyl-L-prolyl-G-tosyl-L-arginyl-glycinamide, having a melting point of 224°, $[\alpha]_D^{22} = -37°$ (dimethylformamide), is obtained.

(f) β - Mercaptopropionyl - L - phenylalanyl - L-phenylalanyl - L - glutaminyl - L - asparaginyl-L-cysteinyl-L-prolyl-L-arginyl-glycinamide The necessary amount of sodium or potassium metal is added to a solution of 5 g. of S-benzyl-β-mercaptopropionyl - L - phenylalanyl - L - phenylalanyl-L-glutaminyl-L-asparaginyl - S - benzyl-L-cysteinyl-L-prolyl-G-tosyl-L-arginyl-glycinamide in 1200 cc. of dry liquid ammonia to give a stable blue coloration. After the addition of 1.5 g. of ammonium chloride, the solution is evaporated to dryness. The residue contains β-mercaptopropionyl-L-phenylalanyl-L-phenylalanyl-L-glutaminyl - L - asparaginyl - L-cysteinyl-L-prolyl-L-arginyl-glycinamide and may be worked up further as such.

(g) Polypeptide compound I

The residue obtained in (f) above is dissolved in 4 litres of 0.01 N acetic acid and is oxidized at a pH value of 6.5–9.0 by the addition of 7.5 cc. of an N solution of hydrogen peroxide in water. The pH value of the solution is adjusted to 4.5 by the addition of dilute hydrochloric acid and after the addition of 50 g. of sodium chloride or 0.34 g. of methanesulfonic acid or 0.406 g. of trifluoroacetic acid, evaporation to dryness is effected, whereby a dry powder results which keeps well. It may be stored and when used it may be dissolved to give a clear solution. However, the solution may also be used as such, if desired after diluting with water or a salt solution.

For purposes of removing the inorganic salts, the above powder, obtained after the addition of trifluoroacetic acid, may be subjected to counter-current distribution in the system *secondary* butanol/water/glacial acetic acid 120:160:1. After 200 transfer stages the substance is present in tubes 50 to 80 with a maximum in tube 64 (K=0.47). After evaporation, the active polypeptide is obtained with a good yield in the form of a hygroscopic acetate, with uniform behavior in chromatography and electrophoresis. Migration in paper electrophoresis at a pH value of 5.8 and 40 v./cm.: 24 mm. in 60 minutes (the histidine used as reference migrates 55 mm.). Migration in paper electrophoresis at a pH value of 1.9 and 40 v./cm.: 38 mm. in 60 minutes (the tryptophane used as reference migrates 72 mm.). Rf in paper chromatography in the system isoamyl alcohol/pyridine/water 35:35:35:0.42. Total hydrolysis (16 hours, 110°, 6 N HCl) yields two equivalents of phenylalanine and one equivalent of each of the following amino acids: glutaminic acid, asparaginic acid, proline, arginine and glycine, and the different disulfides of cysteine and β-mercaptopropionic acid.

EXAMPLE 2

The same procedure as in Example 1 is used, except that final oxidation is effected at 0–35° by the addition of 7.1 cc. of a N solution of potassium ferricyanide in water at a pH value of 5.0–9.0.

EXAMPLE 3

The same procedure as in Example 1 is used, except that final oxidation is effected at 0–35° by the addition of 1.05 cc. of 1,2-diiodoethane dissolved in acetone, at a pH value of 5.5–8.5. After oxidation the excess of 1,2-diiodoethane is extracted with ethyl acetate. The ethyl acetate remaining in the aqueous solution is removed in a vacuum at 20°.

What is claimed is:
1. A compound selected from the group consisting of a compound of formula:

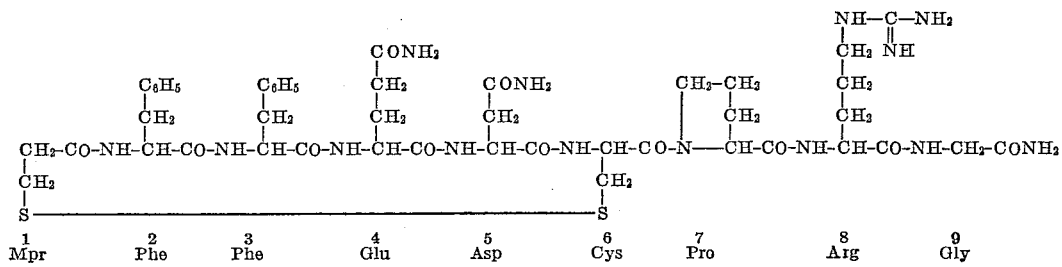

in which optically active amino acids have the L-configuration; and pharmaceutically acceptable acid addition salts thereof.

References Cited

Hope et al., J. Biol. Chem. 237, 3146–3147 (1962).
Huguenin et al. I, Helv. Chim. Acta 45, 1629 (1962).
Huguenin et al. II, Experientia 21, 68–69 (1965).
Sturmer et al., Experientia 21, 583–585 (1965).

LEWIS GOTTS, *Primary Examiner.*

M. M. KASSENOFF, *Assistant Examiner.*

U.S. Cl. X.R.

260—470; 424—177